UNITED STATES PATENT OFFICE.

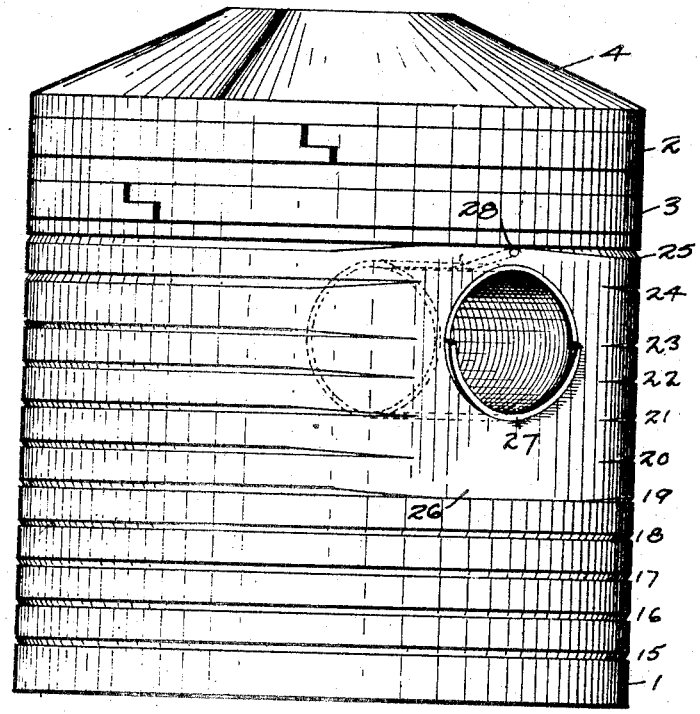

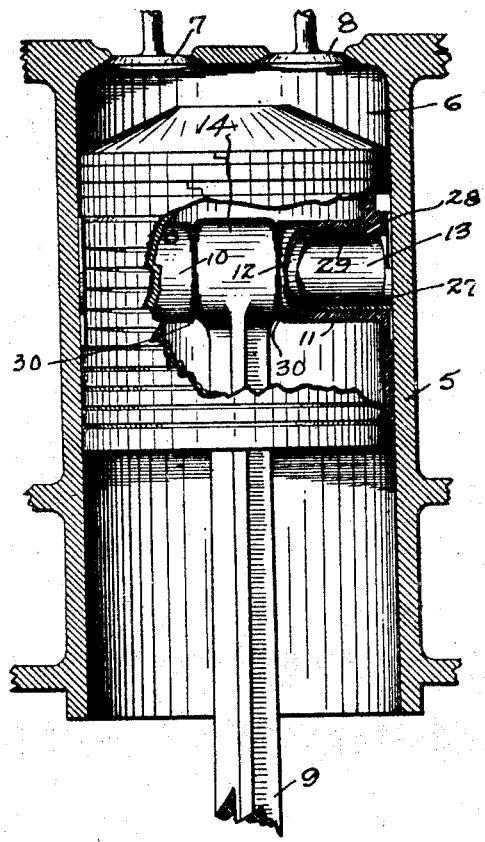

WILLIAM R. GORHAM, OF ALAMEDA, CALIFORNIA.

PISTON.

1,379,257.  Specification of Letters Patent.  Patented May 24, 1921.

Application filed April 23, 1917. Serial No. 163,817.

*To all whom it may concern:*

Be it known that I, WILLIAM R. GORHAM, a citizen of the United States, and a resident of the city of Alameda, county of Alameda, and State of California, have made a new and useful invention, to wit: Improvement in Pistons; and I do hereby declare the following to be a full, clear, concise and exact description of the same.

The invention relates particularly to pistons for internal combustion motors.

Among the objects of this invention are to control the lubrication of the wrist pin bearing within the piston.

Another object is to cause the excess lubrication accumulating upon the cylinder walls to be returned to the crank case of the motor through the wrist pin bearings.

Other objects and advantages will appear as the description progresses.

In this specification and the annexed drawing, the invention is illustrated in the form considered by me to be the best, but it is to be understood that the invention is not limited to such form because it may be embodied in other forms, and it is also to be understood that in and by the claims following the description it is desired to cover the invention in whatever form it may be embodied.

In internal combustion motors, particularly of the vertical cylinder type, it is difficult to properly lubricate the wrist pin bearings within the pistons. The wrist pin is the pin to which the connecting rod is attached. In this type of motor various expedients are resorted to to prevent lubrication from passing the piston and rising into the combustion chamber, wherein an excess amount of oil results in carbon deposits and general fouling. This invention corrects two serious defects in the structure of internal combustion motors at the piston: converting the disadvantage of an excess of oil between the piston and cylinder walls into an advantage by diverting that oil or lubricant into the wrist pin bearings, where there is a dearth of lubrication, resulting in economy of oil and improved lubrication at both points.

In the accompanying one sheet of drawings:

Figure 1 is a side elevation of a piston constructed in accordance with this invention, looking into the wrist pin bearing, shown in perspective.

Fig. 2 is a diagrammatic fragmentary view illustrating the engine cylinder in cross section, having a piston reciprocal therein fragmentarily broken away to illustrate the interrelation of parts.

In detail the construction illustrated in the drawings includes the piston 1 of conventional dimensions having the piston rings 2 and 3 set in annular grooves in said piston, in accordance with common practice. It is the function of the piston rings 2 and 3 to wipe against the walls of the cylinder 5 to act as a sliding packing at this point, to maintain compression in the chamber 6 between the head of the cylinder and the piston. The chamber 6 is alternately opened and closed by the valves 7 and 8, in accordance with the practice in this art. The piston reciprocates freely within the cylinder the distance of the stroke of the crank pin, not shown, to which the connecting rod is suitably journaled. The walls of the piston 1 and the cylinder 5 are separated by a film of oil deposited on the cylinder walls by splash lubrication from the crank case or by other means of lubrication. Because of the large area of the cylinder walls exposed, an excess amount of lubricant must be applied thereto to insure distribution over the whole area. Friction at this point being considerable, taking a thousand feet of piston travel per minute as a normal condition. The result of this excess of oil on the piston and the cylinder walls is that a considerable portion works past the piston rings 2 and 3 into the combustion chamber 6, with undesirable consequences as previously described. To obviate this, various expedients have been resorted to, such as putting a packing ring, such as 2 and 3, at the lower edge of the piston, or to cut an annular groove therein having perforations through the wall of the piston back to the interior thereof, so that the excess oil scraped in this groove can pass through the perforations connected with the crank case, which expedient is satisfactory and is now common practice, disposing of the excess lubrication between the piston and the cylinder. This expedient, however, robs the wrist pin of practically its only chance for proper lubrication, as the lubricant is scraped back into the crank case before rising to the level of the wrist pin bearing.

The wrist pin bearing illustrated in the drawing (see Fig. 2) consists of the inwardly extending lugs 10 and 11, preferably cast integrally with the walls of the piston. These lugs are properly bored at right angles to the axis of the piston to receive the friction bushings 12 fixed therein. These bushings provide a wearing surface for the wrist pin 13 fixed into the head 14 of the connecting rod 9, the lateral extension of the wrist pin 13 oscillating in the bushing 12. For the purpose of accumulating the surplus oil between the walls of the piston and cylinder, the annular grooves 15 to 25 inclusive are turned in the periphery of the piston; these grooves are preferably triangular in cross section with the base of the triangle at right angles to the longitudinal axis of the piston, one side of the triangle being formed by the contiguous wall, of the cylinder, the hypotenuse of the triangle being directed upward in the grooves from 15 to 23, the hypotenuse of the grooves 24 and 25 being oppositely disposed or directed downward. The grooves from about 19 to 25 lead into depressions formed on opposite sides of the piston adjacent to and surrounding the entrance of the bushings 12. During the upstroke of the piston, the oil on the cylinder walls is scraped into the grooves where it accumulates and is elevated by the piston in the grooves 19 to 25, being delivered to the depressions 26 on opposite sides of the piston, whence it flows past the end of the bushing, the upper half of the circumference of which is flush with the wall of the depression 26 and the lower half of the circumference of which extends beyond the wall 26 contiguous to the surface of the cylinder, the oil accumulating within the end of the bushings on the ledge 27 on the upstroke and flows beneath the wrist pins 13 that bear against the upper surface of the bushing on the upstroke of the piston, forming a thin film of oil between the wrist pin and the lower portion of the bushing. On the down stroke of the piston, the power is applied to the lower portion of the wrist pin against the interposed film of oil, leaving the play in the bearings above the upper diameter of the wrist pin and the upper diameter of the bushing, into which the surplus oil in the depression 26 is forced by the descent of the piston, the shape of the groove being such that the oil is forced through the oil holes 28, distributing the oil over the top of the pin 13, the surplus oil passing from the inner end of the bearing as at 30 from which it drops back into the crank case.

It is not unusual in such design of motors to reverse the order of the crank pin bearings by fixing it in the piston and mounting the head 14 of the connecting rod loosely thereon, permitting the oscillations to take place between the crank shaft and the head of the connecting rod. In this form of construction the oil would flow through the hollow wrist pin 13 and be delivered through a by-pass through the walls of the wrist pin into the bearing within the head 14, such an expedient being an obvious modification.

Claims:

1. A piston having exterior depressions contiguous to the wrist pin bearings therein and grooves angular in cross section and oppositely disposed leading into said depressions.

2. A piston having exterior depressions contiguous to the wrist pin bearings therein and grooves angular in cross section and oppositely disposed respectively above and below said bearings leading into said depressions.

3. A piston having exterior depressions contiguous to the wrist pin bearings therein and grooves opening outwardly and upwardly below said bearings and downwardly and inwardly into said depressions contiguous to said bearings into said depressions.

4. A piston having exterior depressions contiguous to the wrist pin bearings therein and having grooves opening outwardly and upwardly below said bearing and downwardly and inwardly into said depressions contiguous to the said bearings; into said depressions; and a by-pass above said depressions directed onto said bearing.

In testimony whereof, I have hereunto set my hand, this 16th day of April, 1917.

WILLIAM R. GORHAM.

In presence of—
ALAN FRANKLIN,
LINCOLN V. JOHNSON.